(12) United States Patent
Pan et al.

(10) Patent No.: US 7,757,181 B2
(45) Date of Patent: Jul. 13, 2010

(54) AGENDA AND DAY HYBRID CALENDAR VIEW

(75) Inventors: David Tianzhou Pan, Kirkland, WA (US); Ranjit Kumar Gupta, Redmond, WA (US); Autumn L. Stroupe, Issaquah, WA (US); Neeti Gupta, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 11/465,929

(22) Filed: Aug. 21, 2006

(65) Prior Publication Data
US 2007/0260503 A1 Nov. 8, 2007

Related U.S. Application Data

(60) Provisional application No. 60/746,551, filed on May 5, 2006.

(51) Int. Cl.
*G06F 3/048* (2006.01)
(52) U.S. Cl. ........................ 715/772; 715/764
(58) Field of Classification Search ................. 715/772
See application file for complete search history.

(56) References Cited

U.S. PATENT DOCUMENTS

| | | | |
|---|---|---|---|
| 5,023,851 A | 6/1991 | Murray et al. | |
| 5,970,466 A | 10/1999 | Detjen et al. | |
| 6,064,974 A | 5/2000 | Broekhuijsen | |
| 6,373,817 B1* | 4/2002 | Kung et al. | 370/217 |
| 6,640,230 B1* | 10/2003 | Alexander et al. | 707/10 |
| 6,757,530 B2 | 6/2004 | Rouse et al. | |
| 6,892,346 B1 | 5/2005 | Lamb et al. | |
| 6,988,128 B1* | 1/2006 | Alexander et al. | 709/206 |
| 7,107,316 B2* | 9/2006 | Brown et al. | 709/207 |
| 7,313,767 B2* | 12/2007 | Mak | 715/864 |
| 7,392,041 B2* | 6/2008 | Brush et al. | 455/414.1 |
| 7,496,352 B2* | 2/2009 | Kaminsky et al. | 455/412.2 |
| 7,529,540 B2* | 5/2009 | Cox et al. | 455/414.1 |
| 2002/0069145 A1 | 6/2002 | Collado et al. | |

(Continued)

FOREIGN PATENT DOCUMENTS

JP   2004364165 A2   12/2004

(Continued)

OTHER PUBLICATIONS

Microsoft Outlook Snapshot. Copyright 2003.*

(Continued)

*Primary Examiner*—Doug Hutton
*Assistant Examiner*—Soumya Dasgupta
(74) *Attorney, Agent, or Firm*—Woodcock Washburn LLP (57) ABSTRACT

A user interface and user interface control for displaying calendar data is provided. In particular, the user interface provides a hybrid view that includes both a schedule view of listed calendar items together with an overview strip that displays a compressed version of the schedule view. The selection of an appointment is reflected in both the schedule view portion of the view and the overview strip. As a result, users are able to easily see conflicts and free time while retaining a simple chronological listing of their day's commitments. Through the use of this hybrid view, the number of views to navigate between can be reduced without sacrificing function to simplify the calendaring experience.

20 Claims, 10 Drawing Sheets

600

| Priority | Status | RGB Value |
|---|---|---|
| 1 | OOF | 211, 176, 235 |
| 2 | Busy | 150, 150, 225 |
| 3 | Tentative | 200, 200, 240 |
| 4 | Free | 255, 255, 255 |

U.S. PATENT DOCUMENTS

| | | | |
|---|---|---|---|
| 2002/0194379 A1* | 12/2002 | Bennett et al. | 709/246 |
| 2003/0055908 A1* | 3/2003 | Brown et al. | 709/207 |
| 2003/0061087 A1* | 3/2003 | Srimuang | 705/8 |
| 2004/0225966 A1 | 11/2004 | Besharat et al. | |
| 2005/0041667 A1 | 2/2005 | Miller et al. | |
| 2005/0278211 A1* | 12/2005 | Adams | 705/10 |
| 2005/0278217 A1* | 12/2005 | Adams et al. | 705/14 |
| 2006/0010217 A1* | 1/2006 | Sood | 709/206 |
| 2006/0053044 A1 | 3/2006 | Kurian et al. | |
| 2006/0069604 A1 | 3/2006 | Leukart et al. | |
| 2008/0299960 A1* | 12/2008 | Lockhart et al. | 455/418 |

FOREIGN PATENT DOCUMENTS

| | | |
|---|---|---|
| KR | 20040061645 A | 7/2004 |
| KR | 20050024601 A | 10/2005 |
| KR | 100617805 B1 | 8/2006 |

OTHER PUBLICATIONS

Harl, Phillip. "Visualization of Calendar Data." (no date available).*
Pousman et al. "A Taxonomy of Ambient Information Systems: Four Patterns of Design." Copyright May 26, 2006.*
Overgaard et al. "Behavior Modeling." Copyright: 2001.*
Brzozowski et al."groupTime: Preference-Based Group Scheduling." Apr. 27, 2006.*
Developer One Power Calendar for Windows Mobile Smartphone. http://www.developerone.com/powercalendr/index.htm last viewed Jul. 13, 2006, 4 pages.
EuroCool—Catergory: Calendars Clocks&Alarms. http://www.eurocool.com/catergory/?catergory=Calendars+Clocks%26Alarms last viewed Jul. 13, 2006, 28 pages.
SBSH Mobile Software—Making smaller bigger http://www.sbsh.net/products/papyrus/ last viewed Jul. 13, 2006, 7 pages.
International Search Report dated Oct. 10, 2007 for PCT Application Serial No. PCT/US2007/009326, 2 Pages.

* cited by examiner

| Priority | Status | RGB Value |
|---|---|---|
| 1 | OOF | 211, 176, 235 |
| 2 | Busy | 150, 150, 225 |
| 3 | Tentative | 200, 200, 240 |
| 4 | Free | 255, 255, 255 |

| | |
|---|---|
| Smart Phone Portrait | 12 1 2 3 4 5 6 7 8 9 10 11 12 1 2 3 4 5 6 7 8 9 10 11<br><br>1st Set: 12am – 10am    2nd Set: 8am – 6pm    3rd Set: 2pm – 12am |
| Smart Phone Landscape | 12 1 2 3 4 5 6 7 8 9 10 11 12 1 2 3 4 5 6 7 8 9 10 11<br><br>1st Set: 12am – 12pm    2nd Set: 8am – 8pm    3rd Set: 12pm – 12am |

AGENDA AND DAY HYBRID CALENDAR VIEW

CROSS-REFERENCE TO RELATED APPLICATION

This application claims the benefit of U.S. Provisional Application Ser. No. 60/746,551, entitled AGENDA AND DAY HYBRID CALENDAR VIEW, filed on May 5, 2006, the entirety of which is incorporated herein by reference.

BACKGROUND

Mobile users, particularly those that spend significant time working outside of an office and away from a desk, rely heavily on their mobile or handheld devices to keep themselves organized and on-time for meetings, appointments, and even flights. To address the increasing demands of such users, handheld computing devices such as pocket PCs, smart phones, and mini-compact PCs have lead to smaller and more compact multi-functional devices. However, the ever-shrinking devices also mean smaller and smaller screen sizes. As a result, many new challenges for applications in terms of conveying and displaying content that is both useful and readable have arisen. Take a calendar application for example. In the calendar space, displaying the relevant content to the user tends to be more difficult as screen sizes decrease.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a user interface and user interface control system that facilitates visualizing calendar data from multiple perspectives particularly on smaller handheld devices where screen real estate is limited or restricted. More specifically, the user interface control displays calendar items in a schedule view as well as an overview strip or bar for a current window of time on display. The schedule view provides a detailed linear listing of the calendar items in chronological order according to the indicated time. The calendar items can include appointments, events, and activities that can be associated with a specific time of the day (e.g., 1:30-3:00 PM) or can occur "all-day" with no specific time indicated. Thus, the schedule view displays the name or title of the appointment, event, or activity, time, and location when known in a relatively uncomplicated manner to maximize the amount of text which can be displayed for each calendar item.

In addition to the schedule view, a time-oriented overview strip of existing calendar items can be displayed in the display space along with the schedule view to provide a peripheral understanding of the duration of the calendar items and of when there are free times in the user's day. More specifically, the overview strip can encompass any number of hours or a time window (e.g., 8-hour block of time from 12:00 AM to 8:00 AM), whereby the length or duration of any one calendar item is expressed as a bar. The size of the bar corresponds to the duration of the calendar item. The bars can appear in different colors or shadings to indicate the status of the appointment or the status of the user during the appointment. For instance, a green bar for a meeting can indicate that the user will be out of the office for the meeting or can indicate that the meeting will be conducted via video-conferencing.

The schedule view and overview strip can operate in tandem to provide consistent information to the user when viewing or navigating through the information. For example, as the user scrolls through the schedule view, the overview strip view can shift to the appropriate time window to correspond to the calendar items currently shown in the display space. The shift of the time window either forward or backward can be visualized using various animation effects. As a result of such animation, the user retains context of the content displayed on-screen when the time window shifts.

Calendar items shown in the schedule view can include various visual notifications to inform the user of item status or of conflicts between items. The overview strip can mirror such notifications using similar visual cues to capture the user's attention. The use of such visual cues in the overview strip facilitates scheduling future items in a more efficient manner. Even more so, the combination of the schedule view and the overview strip displayed on-screen at the same time reduces the number of screens the user must navigate between to obtain the information.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with recognizing the time window in which a majority of the user's calendar items occur and then showing this time window upon opening the calendar for viewing. In addition, inference schemes can be employed to determine priorities of conflicting calendar items such as when no priority status has been assigned or when the conflicting items have the same priority. Higher priority items can be visually enhanced to appear more prominent to the user.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
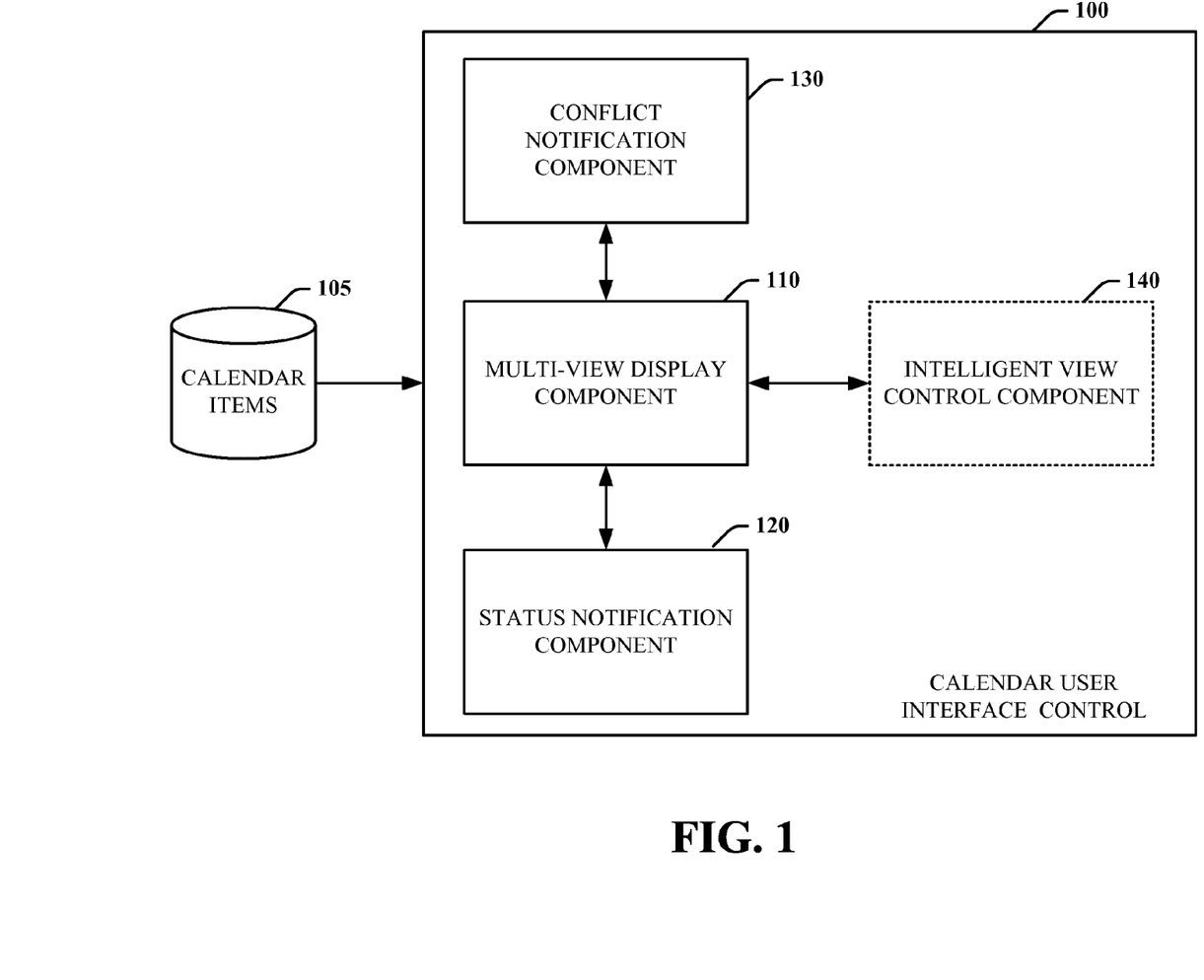
FIG. 1 is a block diagram of a user interface control system that facilitates displaying calendar items from multiple perspectives on a user interface.

Referring now to FIG. 1, there is a block diagram of a user interface control system 100 that facilitates displaying calendar items 105 from multiple perspectives on a screen at the same time, and in particular, on a smaller handheld or portable device screen. The user interface control 100 includes a multi-view display component 110 that can display calendar items 105 in at least two different perspectives. A first or primary perspective provides a linear listing of the current or upcoming calendar items on a particular day. Due to limited screen real estate and the amount of text displayed for each calendar item, the display component 110 can display at least a subset of the items 105 occurring within a time window. For example, suppose the time window spans a 10 hour period (e.g., 2:00 PM-12:00 AM). The screen size may only allow for the items occurring between 2:00 and 6:30 PM to be displayed, thereby requiring the user to scroll down to view the appointments occurring thereafter.

A second or supplemental perspective provides a peripheral overview or compressed view of the calendar items 105 that exist within a time window. This view mitigates the need to page or scroll to additional screen views to see the activities planned during the particular time window. For instance, referring to the same example as above, the peripheral overview can display the hours within the time window of 2 PM-12:00 AM in a vertical or horizontal strip. A bar spanning the time or duration of each calendar item 105 can be used to represent the respective item. The length of the bar can indicate the duration of the item (e.g., FIG. 4, infra) in order to quickly convey when the user has planned activities or when the user has free time (e.g., available). For example, imagine the user has an hour long event scheduled from 4-5:00 PM. The length of the bar would span from hour 4 to hour 5. Now imagine that another event is scheduled from 2 PM to 2:30 PM. In this case, the length of the bar would span from hour 2 to about a midpoint between hours 2 and 3. Moreover, the peripheral view provides a user with quick information regarding her availability throughout the day while at the same time displaying current and upcoming appointments in more detail as well.

To further facilitate the amount or quality of information that is provided to the user via the multi-view display component 110, a status notification component 120 can enhance the visual representations of calendar items in the schedule view as well as in the peripheral overview. For example, various colors can be selected to indicate different status states such as out of office, busy, tentative, and free. A lunch meeting can be colored orange to indicate that the user will be out of the office for this appointment. Therefore, the calendar item can appear orange in both the schedule view as well as in the peripheral view.

The user interface also includes a conflict notification component 130. The conflict notification component 130 can provide a visual cue when a conflict exists between calendar items. In particular, the conflict visual cue can be represented in the specific calendar item in the linear listing and a corresponding visual indicator can be shown when the respective bar in the peripheral overview is selected.

As discussed earlier, the peripheral overview view can display a selected block of time (e.g., in hours). When initially viewing the calendar items on "open" in the calendar application/program, the home view of the calendar can be customized by way of an intelligent view control 140. The home view can set a default time window to always appear initially when opening or activating the program. For example, the home view can automatically show only morning or only afternoon activities. In the alternative, the intelligent view control 140 can examine the user's calendar items and determine when most of the calendar items are scheduled and then show the time frame that shows the majority of items. For instance, suppose that a majority of the user's calendar items occur in the morning (a first time window). Based on this determination, the intelligent view control 140 can infer that the more appropriate home view is the "morning" time window. The time window appearing in the home view can change daily based on the calendar items for the given day or can be fixed (e.g., always show the morning time window).

The intelligent view control 140 can also determine which time window to show in the home view by examining the priority or importance level assigned to the calendar items. For example, imagine that there are two high priority items scheduled in the morning (e.g., before noon) and 6 "normal" or lower priority items set in the afternoon (e.g. noon-5 PM).

The intelligent view control 140 can be programmed to automatically show the higher priority items in the home view even though the majority of the user's activities are scheduled in the afternoon.

Figure 2:
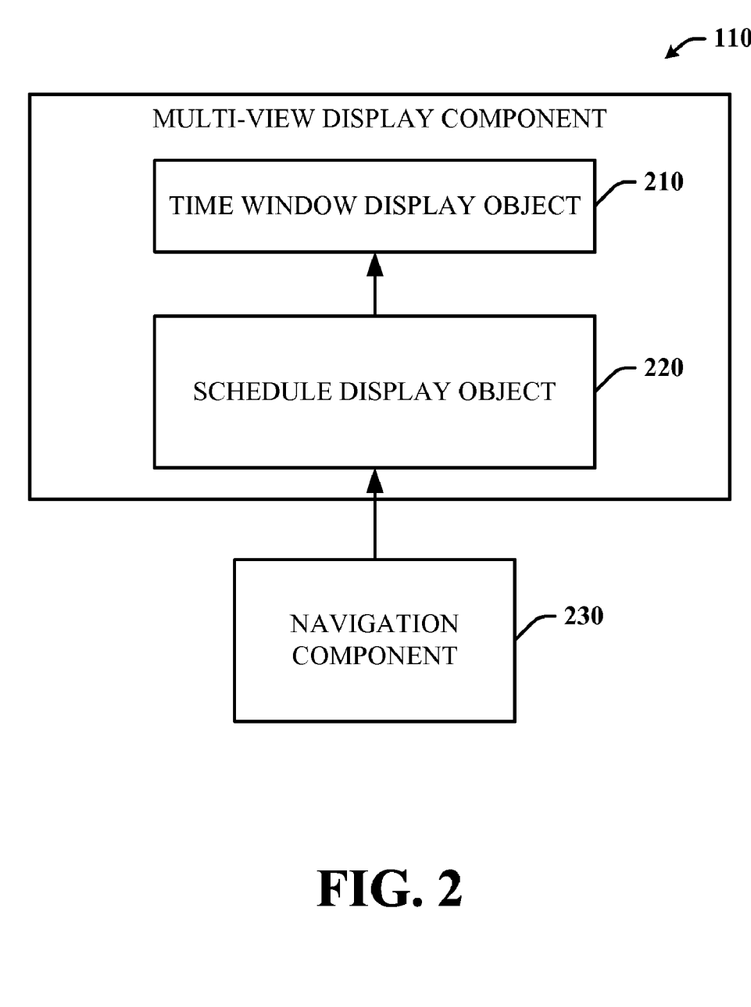
FIG. 2 is a block diagram of a user interface control system that displays calendar items from at least two different perspectives (e.g., schedule view and overview strip view) to provide a user with both current and peripheral information.

Referring now to FIG. 2, there is a block diagram of the multi-view display component 110 as introduced in FIG. 1 that displays calendar items from at least two different perspectives (e.g., schedule view and overview strip view) to provide a user with both current and peripheral information. The user interface includes a time window display object 210 and a schedule display object 220—both of which can convey some similar information. In particular, the schedule display object 220 lists calendar items in chronological order so that the user can readily determine the next meeting, appointment, event, etc. The user can easily read the content of each calendar item in the list and through the use of various visual indicators, can quickly determine her state in terms of being busy, out of the office, or tentatively occupied and whether any calendar items conflict with each other.

The time window display object 210 provides a compressed view of the information displayed in the schedule display object 220 for a particular block of time. As the user scrolls through the list of items in the schedule display object 220 (via one or more navigation components 230), the time window can shift or slide left or right depending on the items on display in or by the schedule display object 220. Thus, the time window can be set at 8:00 AM to 6:00 PM. Here, the user can see where items exist during this 10 hour period and can see the duration of each item (e.g., 1 hour, 30 minutes, 1½ hours, etc.).

Figure 3:
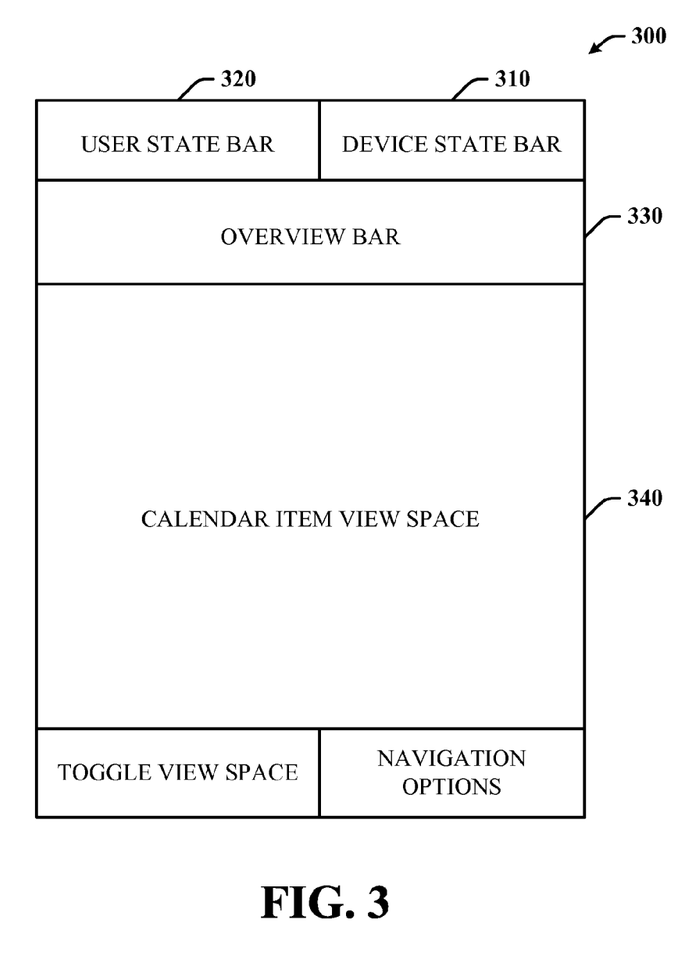
FIG. 3 is a block diagram of an exemplary user interface that provides a better overall sense of a day's outlook quickly at-a-glance while still retaining the ability to see more detailed information regarding at least a subset of calendar items.

Turning now to FIG. 3, there is a diagram of an exemplary user interface 300 that optimizes viewing calendar items from multiple perspectives in a simultaneous manner. The user interface 300 comprises a device state bar 310 that can provide information about the device such as battery life, AC adapter use, signal strength, connection speed, available memory, and the like. The user interface 300 can also include a user state bar 320 that provides information more related to the user or conditions of the user's environment. For example, the user state bar can display the current date and/or time, current ambient temperature, and/or current weather conditions.

In addition, the user interface 300 comprises an overview strip or bar 330 that provides an overview of the user's schedule and availability within a several hour time frame. For instance, the overview bar 330 can indicate a user's availability or when calendar items exist over a 9 hour block of time. By contrast, the user interface 300 also includes a calendar item view space 340 that provides a more detailed view of each calendar item. The calendar item view space 340 can show the first 4 calendar items within that 9 hour block in greater detail. The user can scroll down or navigate to a previous or next page to see any other calendar items that may exist during or outside of that same 9 hour block of time. Hence, the user can get a better overall sense of a day's outlook quickly at-a-glance while still retaining the ability to see more detailed information regarding at least a subset of calendar items that are presently onscreen.

As the user navigates backward or forward through his/her calendar items, animation effects can be utilized to emphasize the change in hours that are visible in the overview bar 330. For example, imagine that the current block of time in the overview bar 330 ranges from 10 AM to 6 PM. The user navigates to view other calendar items in the calendar item view space 340 that are presently off-screen. As the user moves to items set to occur after 6 PM, the block of time in the overview bar 330 can visibly slide to the left to show any events scheduled between 6 PM and 12 AM. By using such animation effects, the user retains some context of the current content when the overview bar shifts in either direction.

Figure 4:
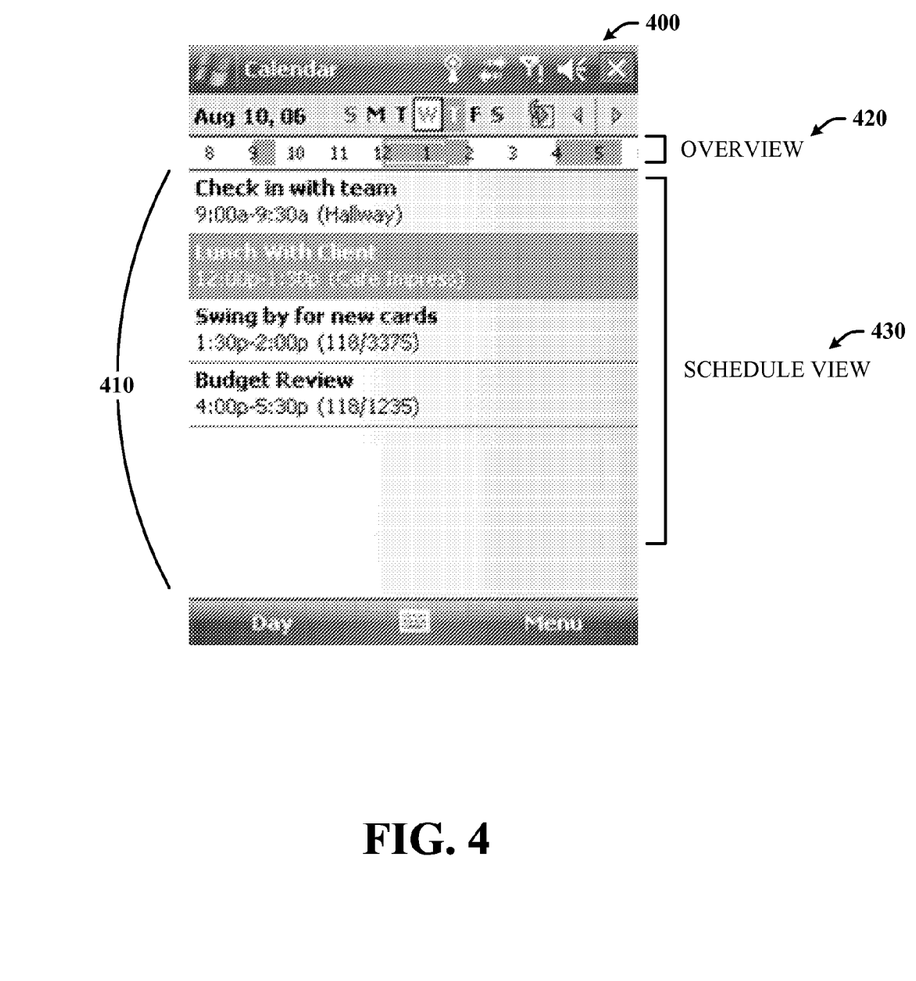
FIG. 4 is an exemplary user interface displaying existing calendar items for a particular day.

FIG. 4 illustrates such features in more graphical detail. In particular, the user interface 400 displays existing calendar items for a particular day (e.g., Sep. 19, 2005) from two different viewpoints. In the first, an overview strip or bar 420 provides a compressed view of the user's activities between the hours of 8 AM and 5 PM. It should be appreciated that the time can be shown in civilian time or in military time such as is depicted in the user interface 400.

In the second, a schedule view 430 provides an expanded view of at least a subset of calendar items 410 at a time. As a result, greater detail with respect to each calendar item is visible. For example, the overview bar 420 indicates that the user has an activity at 9:00 to 9:30 AM; an activity at 12:00 to 1:30 PM; an activity at 1:30 to 2:00 PM; and another activity at 4:00 to 5:30 PM. By quickly glancing at the screen, the user can discern when he has free time. However, at the same time, the user can also see what activity is planned from 9:00 to 9:30 in the morning as well as its location. As the user scrolls up or down in the schedule view 430, the overview bar 420 can shift automatically to the appropriate block of time without direct user manipulation.

In addition to indicating when calendar items are set to occur and their duration, the overview bar 420 can also provide more meaningful information about each particular item. For instance, color can be employed to indicate the user's state. One color can signify a "busy" state while another color or a different shade of the same color can signify an "out of office" state. In this user interface 400, the color purple indicates that the user will be out of the office for a lunch meeting at 12:00 PM. Color can also be used to describe additional aspects of the item. For instance, pink can designate appointments or activities for the user's daughter; green can be used for the user's doctor appointments; and red can be used for "attendance mandatory" events. Thus, when the user sees pink or green items, he can immediately recognize and acknowledge particular details about the respective items without actually looking up or referencing the items in the schedule view 430.

Navigation within the calendar item view space (or schedule view 430) can also be visualized in the overview bar 420. For example, imagine that the user highlights the 12:00 PM appointment in the schedule view. The corresponding time is also selected or boxed (blue selection box) in the overview bar 420. Similarly, an item's color can be reflected in both the overview bar 420 and the schedule view 430.

Figure 5:
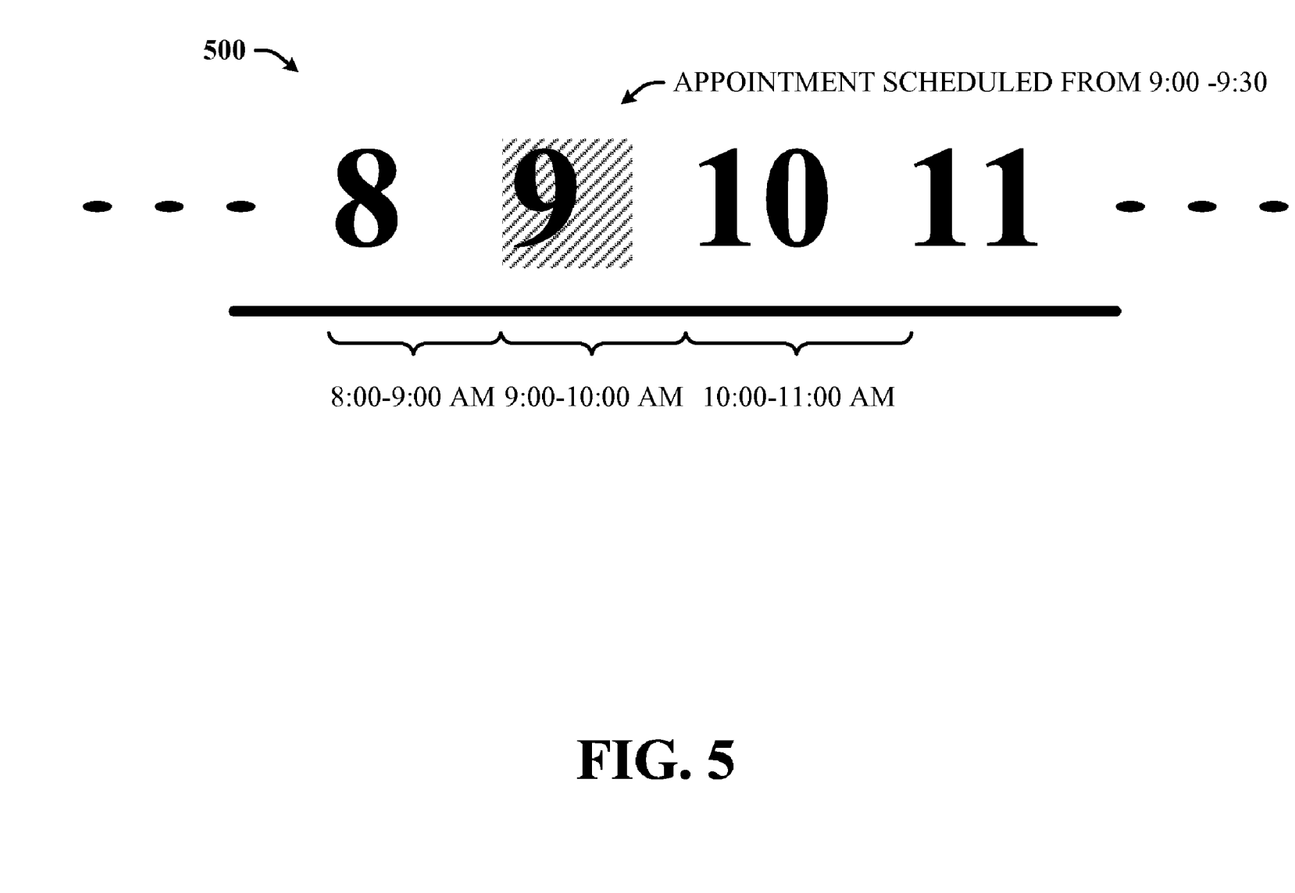
FIG. 5 is an enlarged view of an exemplary overview strip that demonstrates the manner in which a calendar item is represented in the overview strip.

FIG. 5 provides an enlarged view of an exemplary overview strip 500 in order to better illustrate the spacing of hours. The overview strip allows the user to view his schedule and availability from a time-line perspective. As indicated in FIG. 5, each segment of time (e.g., each hour) in the strip starts at the left edge of the number and ends at the left edge of the next number. If an appointment is scheduled to start at 9:00 AM and end at 9:30 AM, then a first portion of the 9 o'clock segment can be shaded to indicate that an event is scheduled to begin at 9:00 AM and last for 30 minutes. For very short appointments such as those that last for 0 or 1 minute, a minimum of one vertical line of pixels can be displayed to indicate to the user that an item, though very brief in duration, exists at that time.

Figure 6:
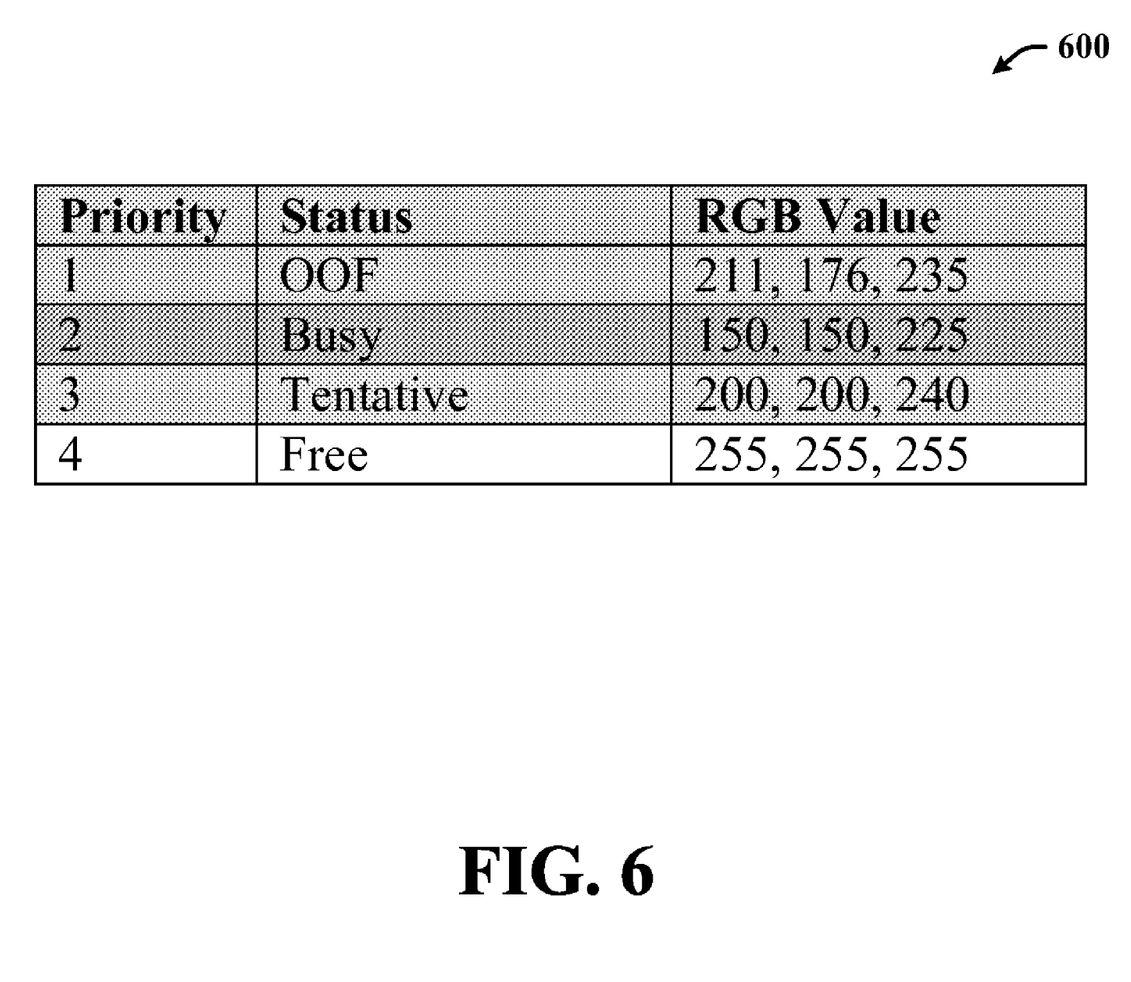
FIG. 6 is a diagram of exemplary status indicators and corresponding visual cues (e.g., color) for each that can be reflected in the calendar item in the schedule view as well as in the same item indicated in the overview strip.

FIG. 6 is a diagram 600 of exemplary status indicators and corresponding visual cues (e.g., color) that can be reflected in a calendar item in the schedule view as well as in the overview strip. For example, various shades of blue to purple can indicate tentative, busy, and out of office, whereas white can indicate "free". It should be appreciated that other colors or status types can be employed as well.

Figure 7:
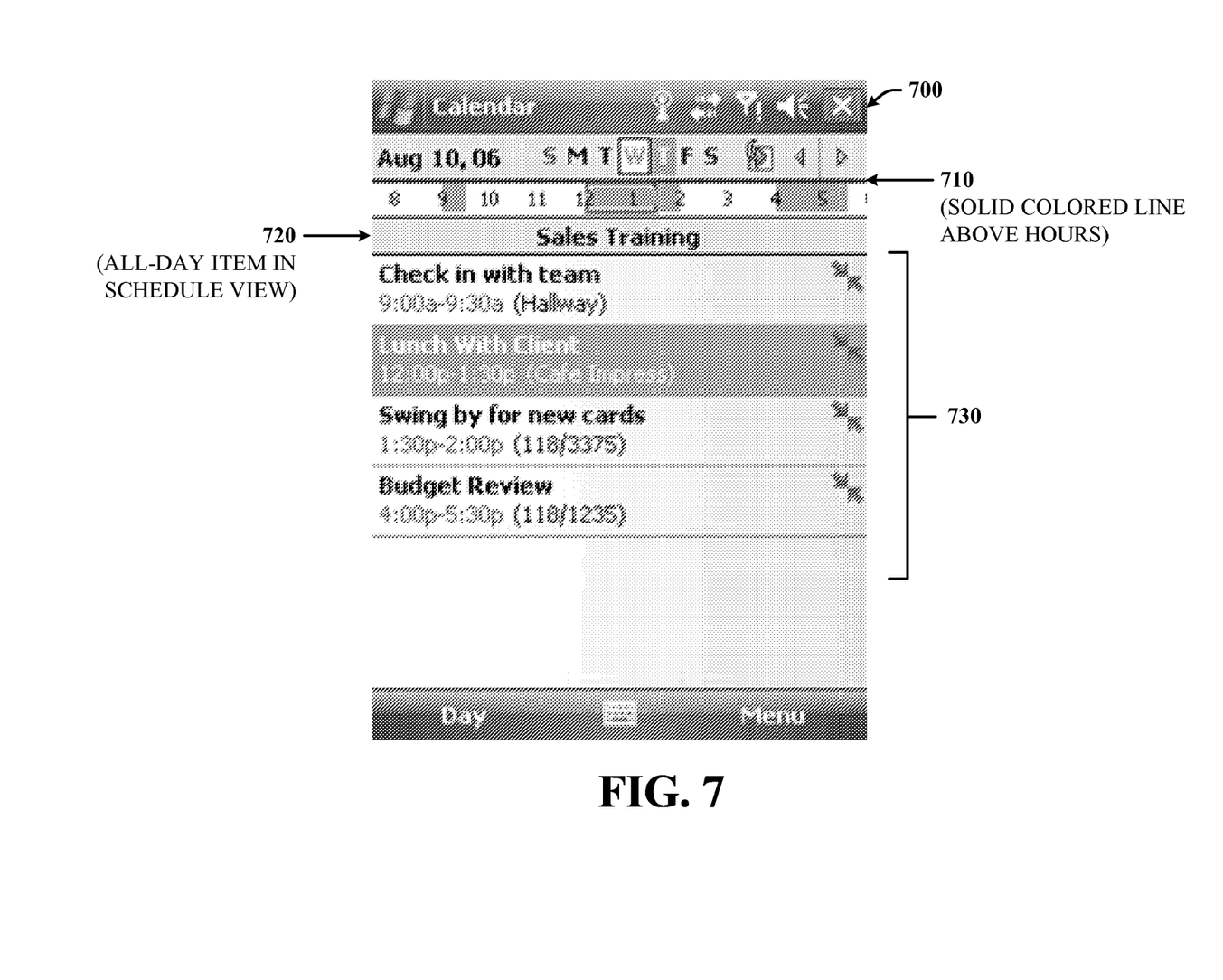
FIG. 7 is an exemplary user interface displaying a visual representation corresponding to at least one all-day calendar item as it is reflected in the schedule view and overview strip view.

Moving on to FIG. 7, there is an exemplary user interface 700 which displays two different visual indicators for an all-day calendar item. In particular, the schedule view and overview strip view each include one visual indicator. The overview strip displays a solid line 710 above the hours whereas the schedule view displays the text of the all-day item 720 set apart from all of the other calendar items 730. The color of the line and the calendar item can correspond to a status indicator as discussed in FIG. 4 and FIG. 6, supra. When more than one all-day item is scheduled for any one day, the line can be depicted in various manners in order to represent that more than one all-day event is planned for that day. Alternatively, the solid line can notify the user that at least one all-day event exists on that day. It should be appreciated that the line 720 can be solid as shown in FIG. 7 or can appear as dotted, dashed, or otherwise broken to provide the user with additional context regarding the item.

Figure 8:
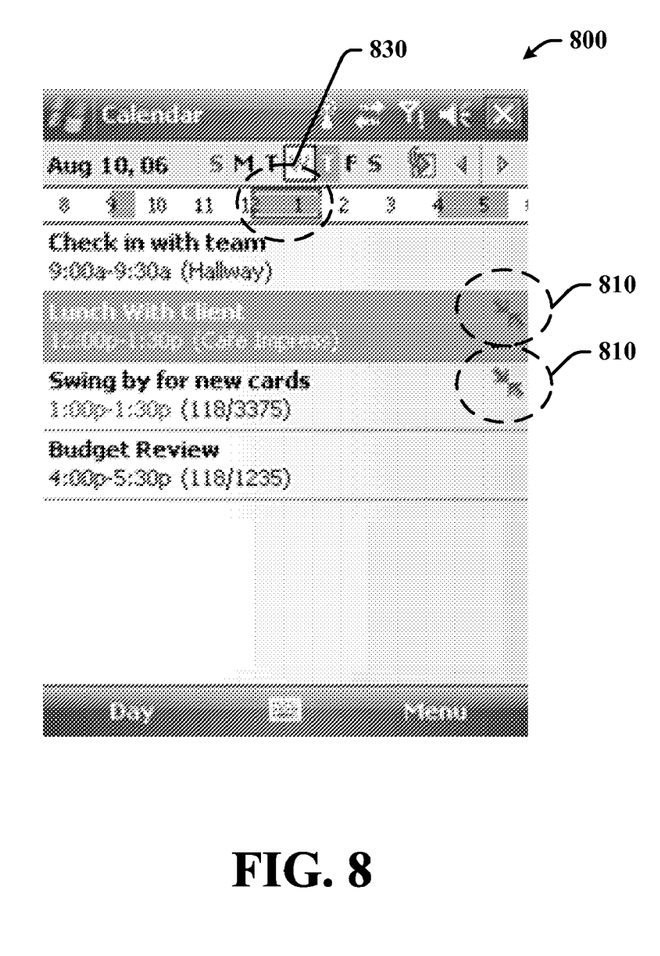
FIG. 8 is an exemplary user interface displaying a visual representation of conflicting calendar items in the schedule view and overview strip view.

Turning now to FIG. 8, there is an exemplary user interface 800 displaying a visual representation of conflicting calendar items both in the schedule view and overview strip. In the schedule view, the conflicting calendar items each have an icon or symbol 810 (encircled by dashed line) displayed thereon. When selected in the schedule view, the corresponding block of time in the overview strip is outlined in some other color such as red to notify the user that calendar items overlap or are in conflict with one another. When appointments overlap each other in the overview strip, priority can be given based on the status of the appointment. The status color of the selected item can be brought to the foreground. Higher priority items can be represented using specified colors, shading, or by associating a symbol therewith so that the user can readily identify which items have a higher priority, and thus require the user's attention. It should be appreciated that lower priority or no-priority items in conflict with higher priority items can still be visible to the user, however they may appear faded or in a different color than higher priority items.

For conflicting items having the same priority, the user interface control system can determine which item the particular user is most likely to prefer and visually enhance that item for easier readability. Such determinations can be made using inference systems as well as artificial intelligence systems that can learn from the user's historical data including but not limited to previously entered calendar items.

Figure 9:
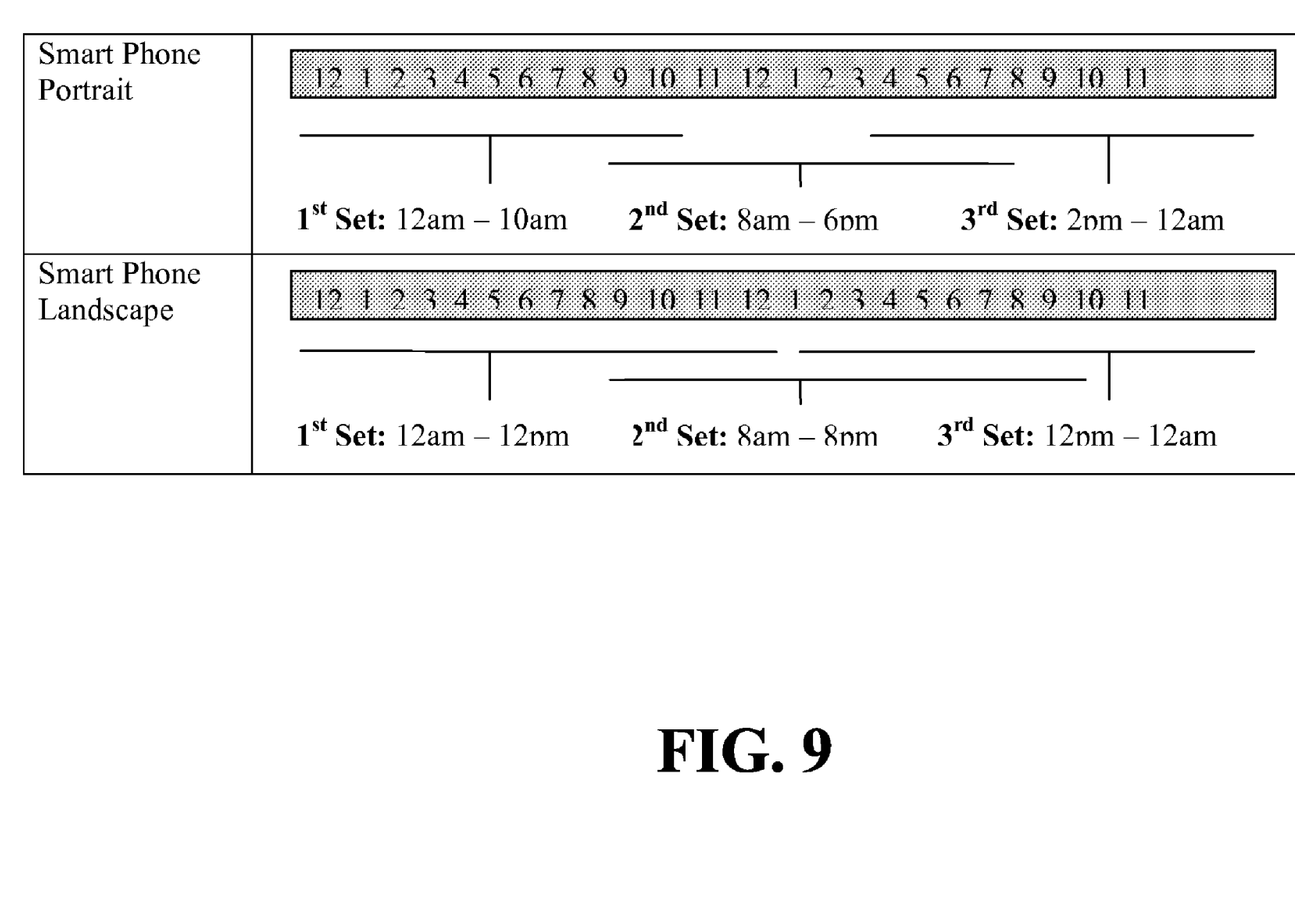
FIG. 9 is a diagram that demonstrates exemplary time windows for a 24-hour period which can be based on screen orientation (e.g. portrait or landscape).

Moving on to FIG. 9, there is a diagram that demonstrates exemplary time windows for a 24-hour period which can be based on screen orientation (e.g., portrait or landscape). For most users, the majority of their daily activity takes place within an 8-10 hour span of time. By setting fixed or flexible time windows, the number of context changes the user will have to experience as they navigate their schedule view can be minimized. The scrolling itself can employ the following algorithm:

Initial Condition: start in the $2^{nd}$ set of hours (including days which have no appointments at all).

When an appointment is selected, check if any part of that appointment is visible in the set of hours currently shown.

If so, stay in the current set of hours.

If not, page to the appropriate set of hours so it is visible.

If the appropriate set of hours is ambiguous, show the set which is in closest time proximity to the currently shown set of hours. For example: if the user scrolls from a 6 AM appointment (unambiguously in the $1^{st}$ set) to a 5 PM appointment (in both the $2^{nd}$ and $3^{rd}$ sets), the algorithm should choose set 2 since it is closer to set 1.

Figure 10:
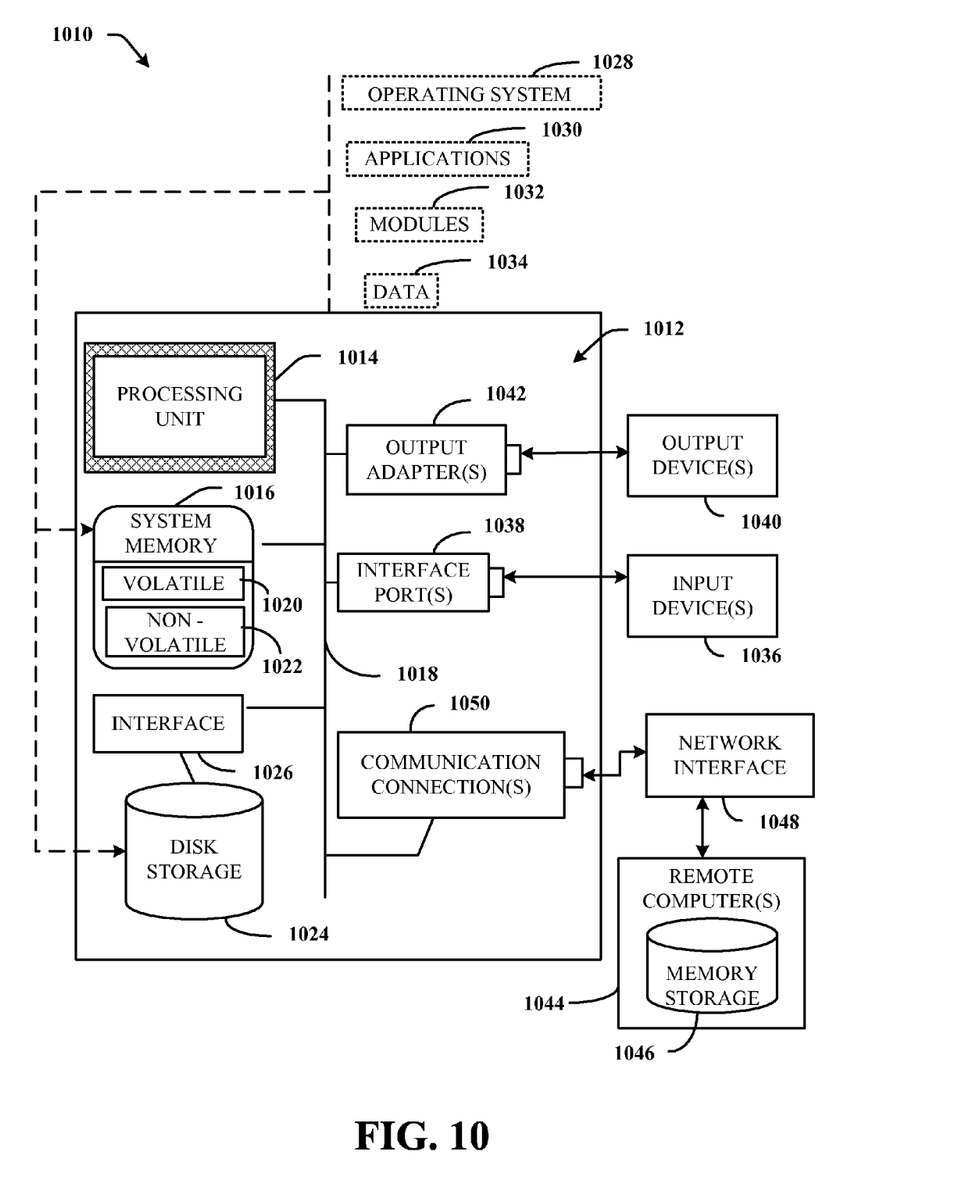
FIG. 10 illustrates an exemplary environment for implementing various aspects of the invention.

In order to provide additional context for various aspects of the subject invention, FIG. 10 and the following discussion are intended to provide a brief, general description of a suitable operating environment 1010 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), static DRAM (SDRAM), double data rate SDRAM (DDR SDRAM), enhanced SDRAM (ESDRAM), Synchlink DRAM (SLDRAM), and direct Rambus (DRDRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. Computer-readable storage medium having stored thereon computer readable instructions that when executed by a computing system provide a user interface that optimizes limited screen real estate when displaying calendar information, the user interface comprising:
    an overview strip that provides an overview of calendar items according to when they are scheduled to occur as well as user availability within a several hour time frame, the overview strip comprising a chronological time line with a user's availability and schedule indicated thereon; and
    a calendar item view space that provides a more detailed view of one or more calendar items whereby the number of calendar items visible at once depends in part on available screen real estate,
    wherein the overview strip is adapted to display a conflict indication that a first calendar item conflicts with a second calendar item and that the first calendar item has priority over the second calendar item,
    wherein the conflict indication comprises using a first color to display the first calendar item and using a second color to display the second calendar item, the first color specifying the first calendar item has a higher priority,
    wherein, when the first calendar item and the second calendar item have the same priority, the instructions determine which of the items the user is most likely to prefer and visually enhances that item for easier readability.

2. The user interface of claim 1, wherein the overview strip is oriented in a horizontal manner above the calendar item view space.

3. The user interface of claim 1, wherein the overview strip comprises a line when at least one all-day calendar item exists for a given day.

4. The user interface of claim 1, wherein the overview strip comprises bars for each calendar item that indicates the calendar item's duration, wherein each bar appears at the items respective times.

5. The user interface of claim 4, wherein the bars in the overview strip appear in the same color as displayed in the calendar item view space.

6. The user interface of claim 5, wherein color represents at least one of the following: status of the calendar item, status of the user for the calendar item, and priority of the calendar item.

7. The user interface of claim 4, wherein the bar is one pixel in length for a calendar item lasting 1 minute or less in duration.

8. The user interface of claim 1, wherein conflicting calendar items are indicated by at least one of a symbol, icon, or color.

9. The user interface of claim 1, wherein the overview strip provides a peripheral view of user activity and availability across a time window that extends beyond the number of calendar items visible at a time in the calendar item view space.

10. The user interface of claim 1, wherein the calendar items are represented in the overview strip and in the calendar item view space in a similar manner to convey status, selection, and conflict information to the user.

11. The user interface of claim 1, wherein the overview strip comprises a fixed time window based on user preferences when initially opening a calendar program.

12. The user interface of claim 1, wherein the overview strip comprises a flexible time window which is based on when a majority of the calendar items are scheduled for a given day, thus minimizing context changes during navigation of the calendar item view space.

13. A user interface control system that facilitates displaying calendar items from multiple perspectives on a screen, comprising:
   means for displaying one or more calendar items in a schedule view and an overview strip, the overview strip comprising a chronological time line with a conflict being indicated thereon;
   means for displaying at least one status indicator that indicates a status of a calendar item listed in the schedule view and the overview strip; and
   means for providing at least one conflict indicator to indicate the conflict between calendar items in the schedule view and in the overview strip view, the at least one conflict indicator comprising an indication in the overview strip that a first calendar item conflicts with a second calendar item and that the first calendar item has priority over the second calendar item,
   wherein the at least one conflict indicator indicates that the first calendar item has priority over the second calendar item by using a first color in displaying the first calendar item in the overview strip and using a second color in displaying the second calendar item in the overview strip, the first color specifying the first calendar item has a higher priority,
   wherein, when the first calendar item and the second calendar item have the same priority, the system determines which of the items the user is most likely to prefer and visually enhances that item for easier readability.

14. A user interface control system that facilitates displaying calendar items from multiple perspectives on a screen comprising:
   a processor that executes the following computer executable components:
      a multi-view display component displays one or more calendar items in a schedule view and an overview strip view, the overview strip comprising a chronological time line with a user's availability and schedule indicated thereon, the multi-view display component comprising a schedule display object and a time window display object;
      a status notification component that displays at least one status indicator that indicates a status of a calendar item listed in the schedule view and the overview strip; and
      a conflict notification component that provides at least one conflict indicator to indicate a conflict between calendar items in the schedule view and the overview strip, the at least one conflict indicator comprising an indication in the overview strip that a first calendar item conflicts with a second calendar item and that the first calendar item has priority over the second calendar item,
   wherein the at least one conflict indicator indicates that the first calendar item has priority over the second calendar item by using a first color in displaying the first calendar item in the overview strip and using a second color in displaying the second calendar item in the overview strip, the first color specifying the first calendar item has a higher priority,
   wherein, when the first calendar item and the second calendar item have the same priority, the system determines which of the items the user is most likely to prefer and visually enhances that item for easier readability.

15. The system of claim 14, wherein the schedule display object displays at least a subset of the calendar items in a list form.

16. The system of claim 14, wherein the time window display object displays a compressed view of the calendar items that exist within a selected block of time.

17. The system of claim 14, wherein the time window display object displays at least one set of hours for a given day.

18. The system of claim 14, wherein the time window display object displays an all-day indicator to indicate when at least one all-day calendar item exists for a given day.

19. The system of claim 14 further comprises one or more navigation components that facilitate navigating between calendar items in the schedule view.

20. The system of claim 1, wherein the overview strip slides to a different time window based on the calendar items displayed in the schedule view.

* * * * *

UNITED STATES PATENT AND TRADEMARK OFFICE
CERTIFICATE OF CORRECTION

| | | |
|---|---|---|
| PATENT NO. | : 7,757,181 B2 | Page 1 of 1 |
| APPLICATION NO. | : 11/465929 | |
| DATED | : July 13, 2010 | |
| INVENTOR(S) | : David Tianzhou Pan et al. | |

It is certified that error appears in the above-identified patent and that said Letters Patent is hereby corrected as shown below:

In column 12, line 53, in Claim 20, delete "claim 1," and insert -- claim 14, --, therefor.

Signed and Sealed this
Fifteenth Day of February, 2011

David J. Kappos
*Director of the United States Patent and Trademark Office*